US008600651B2

(12) United States Patent
Clark et al.

(10) Patent No.: US 8,600,651 B2
(45) Date of Patent: Dec. 3, 2013

(54) FILTERING OF RELEVANT TRAFFIC FOR DISPLAY, ENHANCEMENT, AND/OR ALERTING

(75) Inventors: Samuel T. Clark, Federal Way, WA (US); Roglenda R. Bowe, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 12/624,872

(22) Filed: Nov. 24, 2009

(65) Prior Publication Data

US 2011/0125399 A1 May 26, 2011

(51) Int. Cl.
*G06F 19/00* (2011.01)

(52) U.S. Cl.
USPC .................. 701/120; 701/45; 701/23; 701/3; 701/117; 701/301; 701/9; 701/423; 348/149; 348/117

(58) Field of Classification Search
USPC ............................ 340/435; 701/120; 342/175
See application file for complete search history.

(56) References Cited

U.S. PATENT DOCUMENTS

| | | | | |
|---|---|---|---|---|
| 6,006,158 | A * | 12/1999 | Pilley et al. | 701/120 |
| 6,690,299 | B1 * | 2/2004 | Suiter | 340/973 |
| 6,785,610 | B2 * | 8/2004 | Baker et al. | 701/301 |
| 6,992,626 | B2 * | 1/2006 | Smith | 342/454 |
| 7,630,829 | B2 * | 12/2009 | Pepitone | 701/120 |
| 7,899,621 | B2 * | 3/2011 | Breed et al. | 701/301 |
| 2002/0089432 | A1 * | 7/2002 | Staggs et al. | 340/945 |
| 2003/0004641 | A1 * | 1/2003 | Corwin et al. | 701/301 |
| 2003/0083804 | A1 * | 5/2003 | Pilley et al. | 701/120 |
| 2004/0095259 | A1 | 5/2004 | Watson | |
| 2004/0174295 | A1 * | 9/2004 | Stayton et al. | 342/182 |
| 2004/0181318 | A1 * | 9/2004 | Redmond et al. | 701/9 |
| 2005/0156777 | A1 * | 7/2005 | King et al. | 342/29 |
| 2007/0200731 | A1 | 8/2007 | Winkler et al. | |
| 2007/0252749 | A1 | 11/2007 | Blaskovich et al. | |
| 2009/0184862 | A1 * | 7/2009 | Stayton et al. | 342/30 |
| 2009/0295622 | A1 * | 12/2009 | Anderson et al. | 342/71 |
| 2009/0319944 | A1 * | 12/2009 | Chikkegowda et al. | 715/804 |
| 2012/0209457 | A1 * | 8/2012 | Bushnell | 701/13 |

FOREIGN PATENT DOCUMENTS

| | | | |
|---|---|---|---|
| EP | 1473546 | A1 | 11/2004 |
| EP | 2071543 | A2 | 6/2009 |
| WO | 2011008643 | A1 | 1/2011 |

OTHER PUBLICATIONS

European Extended Search Report dated Dec. 12, 2011 in EP Application No./Patent No. 10192165.8-1232/2325825.

* cited by examiner

*Primary Examiner* — Thomas Black
*Assistant Examiner* — Paul Castro
(74) *Attorney, Agent, or Firm* — Hope Baldauff, LLC

(57) ABSTRACT

Methods, systems, and computer-readable media described herein provide for filtering relevant traffic from sensed or received traffic information for display, enhancement, or alerting, without requiring knowledge of runway, taxiway, or taxi route locations at an airport. Traffic information is sensed or received regarding nearby aircraft or other vehicles and is filtered using one or more filtering strategies to determine a subset of relevant traffic for which to display traffic indicators and/or traffic data on a display unit in the aircraft. The subset of relevant traffic may be further tested for convergence or potential convergence and filtered using one or more additional filtering strategies to determine traffic having critical traffic conditions for which to enhance the display of the traffic indicators on the display unit or to alert the flight crew of the critical traffic conditions.

18 Claims, 10 Drawing Sheets

FILTERING OF RELEVANT TRAFFIC FOR DISPLAY, ENHANCEMENT, AND/OR ALERTING

BACKGROUND

As an aircraft is approaching, landing, taxiing, or taking-off from an airport, flight crew awareness of the position and state of other aircraft and vehicles operating in proximity to the airport ("airport traffic") may mitigate, reduce, or prevent traffic collisions, near misses, or other incidents. Commercial aircraft and many military and private aircraft may be equipped with an automatic position broadcast system, such as automatic dependent surveillance-broadcast ("ADS-B"). An aircraft or other vehicle equipped with ADS-B periodically broadcasts its position and other information to other aircraft or ground stations within receiving range. The receiving aircraft ("ownship") may then use the broadcasted information to track the position and state of the traffic within proximity to the airport and display this data to the flight crew for increased operational awareness. Ownship may also have other means of detecting and sensing traffic and vehicle position, velocity, and other information, such as adapted weather radar.

At a busy airport, there may be scores of aircraft and other vehicles broadcasting position and state information within range of the airport. Even if the relevant airport traffic is limited to a given volume, e.g. traffic operating at or below 1000 feet and within 3 nm beyond the ends of the runways, the number of aircraft and other vehicles may still prove too many to make display to the flight crew effective. Hazardous, potentially hazardous, or other relevant airport traffic may be best identified in the context of runway related operations of the vehicles and relative ownship and traffic positions and velocities. For example, during ownship taxi, traffic taking off or on approach/landing may be hazardous, while during ownship takeoff or approach/landing, runway related taxi traffic or takeoff and approach/landing traffic on an intersecting runway is potentially hazardous.

However, integration of broadcast traffic tracking and display systems with airport map databases or other source of runway, taxiway, or taxi route locations at an airport may not be feasible, practical, or cost effective, making deterministic identification of runway related traffic not possible. It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media described herein provide for filtering relevant traffic from traffic information for display, enhancement, and/or alerting. According to embodiments presented herein, traffic position and other information is sensed or received from nearby aircraft or other vehicles. The traffic information is then processed and filtered utilizing one or more filtering strategies to determine a subset of relevant traffic for which to display traffic indicators and/or traffic data on a display unit in the aircraft. The filtering strategies utilized require no knowledge of runway, taxiway, or taxi route locations at an airport. In a further embodiment, the subset of relevant traffic is also filtered using one or more filtering strategies to determine traffic having critical traffic conditions for which to enhance the display of the traffic indicators on the display unit or to alert the flight crew of the critical traffic conditions.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
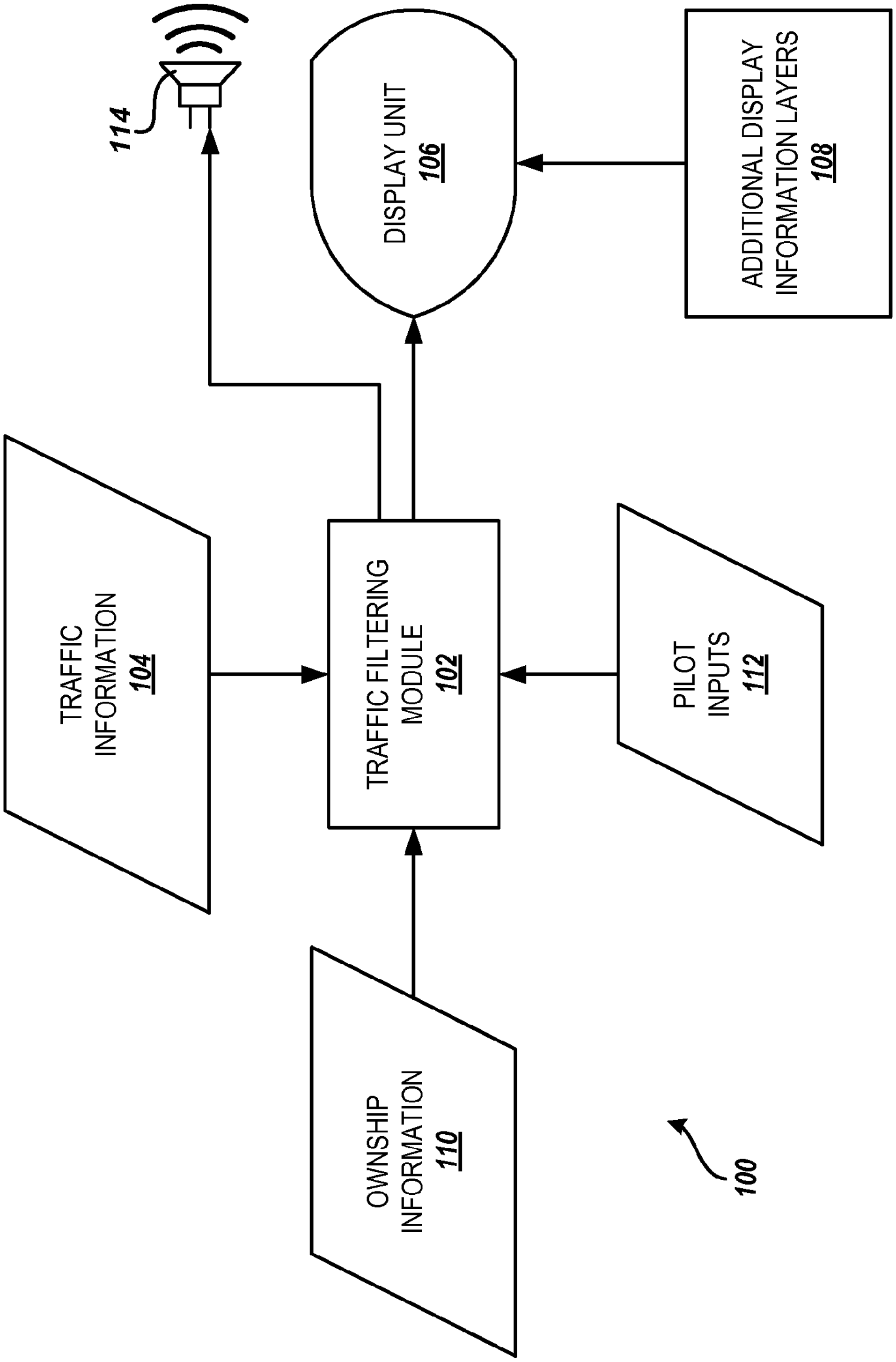
FIG. 1 is a block diagram illustrating various aspects of a traffic filtering system of an aircraft, according to embodiments presented herein.

The following detailed description is directed to methods, systems, and computer-readable media for filtering relevant traffic from sensed or received traffic information for display, enhancement, and/or alerting. Utilizing the concepts and technologies described herein, a traffic filtering system may be implemented that determines hazardous, potentially hazardous, or other relevant traffic from sensed or received traffic information without requiring knowledge of runway, taxiway, or taxi route locations at an airport. According to embodiments, the system may be implemented without requiring integration with airport map databases or other sources of runway, taxiway, or taxi route locations.

The traffic filtering system may utilize one or more filtering strategies to determine relevant traffic from the traffic information, to display or enhance the display of relevant traffic on an aircraft display, and/or to alert the flight crew of a potentially hazardous or critical traffic condition. The system may provide an alternative to or operate in conjunction with an airport map-based traffic monitoring and display system of the aircraft that provides deterministic identification of runway related traffic. Displaying and enhancing hazardous, potentially hazardous, or other relevant traffic to the flight crew improves crew situational awareness and decreases the potential for traffic collisions, near-misses, and other incidents. These and other advantages and features will become apparent from the description of the various embodiments below.

Throughout this disclosure, embodiments are described with respect to an aircraft and the operation of an aircraft at an airport. An aircraft provides a useful example for embodiments described herein, since it likely represents the majority of vehicles operating within range of an airport. However, it should be understood that the concepts presented herein are equally applicable to ground vehicles operating on the taxiways, runways, and roadways of an airport, including, but not limited to, aircraft tow tractors, emergency response vehicles, aircraft service vehicles, and airport maintenance vehicles.

In the following detailed description, references are made to the accompanying drawings that form a part hereof and that show by way of illustration specific embodiments or examples. In referring to the drawings, like numerals represent like elements throughout the several figures.

FIG. 1 shows various aspects of a traffic filtering system 100 of an aircraft, according to embodiments. The traffic filtering system 100 includes a traffic filtering module 102. The traffic filtering module 102 senses or receives traffic information 104 regarding nearby aircraft and filters the traffic to display and/or enhance the display of relevant traffic on a display unit 106 of the aircraft. The traffic filtering module 102 may be implemented as software, hardware, or a combination of the two within the avionics systems of the aircraft.

The traffic information 104 includes current state vectors and other information regarding nearby aircraft and other vehicles sensed by on-board aircraft systems, data-linked from ground sources, or otherwise received at ownship. The current state vector includes the position, heading, and speed of the aircraft. According to one embodiment, the traffic information 104 may be received via an automatic position broadcast system, such as automatic dependent surveillance-broadcast ("ADS-B"). It will be appreciated that the traffic information 104 may include current state vectors and other information received from other sources, including, but not limited to, automatic dependent surveillance-rebroadcast ("ADS-R") system, traffic information service-broadcast ("TIS-B") system, or other broadcast systems. It will be further appreciated that, for the purposes of this disclosure, a nearby aircraft or other vehicle is any vehicle having an automatic position broadcast system transmitter within operational range of the aircraft. The traffic filtering module 102 receives the state vectors and other information broadcasted by nearby aircraft or other vehicles and filters the information using one or more filtering strategies, described in detail below, to determine the relevant traffic to display and/or enhance on the display unit 106.

The display unit 106 may be located in the cockpit of the aircraft and may be an alphanumeric display, such as a multifunction control and display unit ("MCDU"), or a graphical display, such as a multi-function display ("MFD") found in a modern "glass cockpit." Alternatively, the display may be a laptop computer display, an electronic flight bag display, a handheld display, or some other suitable display. According to one embodiment, the traffic filtering module 102 may display the relevant traffic in conjunction with one or more additional display information layers 108 displayed on the display unit 106 by other avionics systems, such as an airport moving map display, a navigation display ("ND"), or other aircraft display layer.

The traffic filtering module 102 may receive ownship information 110, such as the current state vector of ownship, thrust levels, phase of flight (e.g. take-off, taxi, approach, or landing), and the like. The traffic filtering module 102 may further utilize the ownship information 110 to determine the relevant traffic to display or enhance. For example, different filtering strategies may be utilized at different phases of flight.

The traffic filtering module 102 may also receive pilot inputs 112 that affect the display or enhancement of the relevant traffic on the display unit 106. The pilot inputs may be received from an electronic flight information system ("EFIS") control panel, a display select panel ("DSP"), an MCDU, or other controls or data terminal within the cockpit of the aircraft. Pilot inputs 112 may include an indication of which display unit 106 in the cockpit to include the display of relevant traffic, an indication of which display information layers 108 to display, a type or mode of the display, a range selection for the display, manual traffic symbology and/or traffic data filtering, a selection of filtering strategy(s) to utilize, and the like.

In another embodiment, the traffic filtering module 102 may provide redundant or complimentary aural alerts to the display or enhancement of relevant traffic for certain, critical traffic conditions, based on the filtered traffic information 104 and other data received by the module. The traffic filtering module 102 may provide the accompanying aural information through a speaker 114 also located in the cockpit of the aircraft. The traffic filtering module 102 may also provide the determination of relevant traffic to other avionics systems of the aircraft.

Figure 2A:
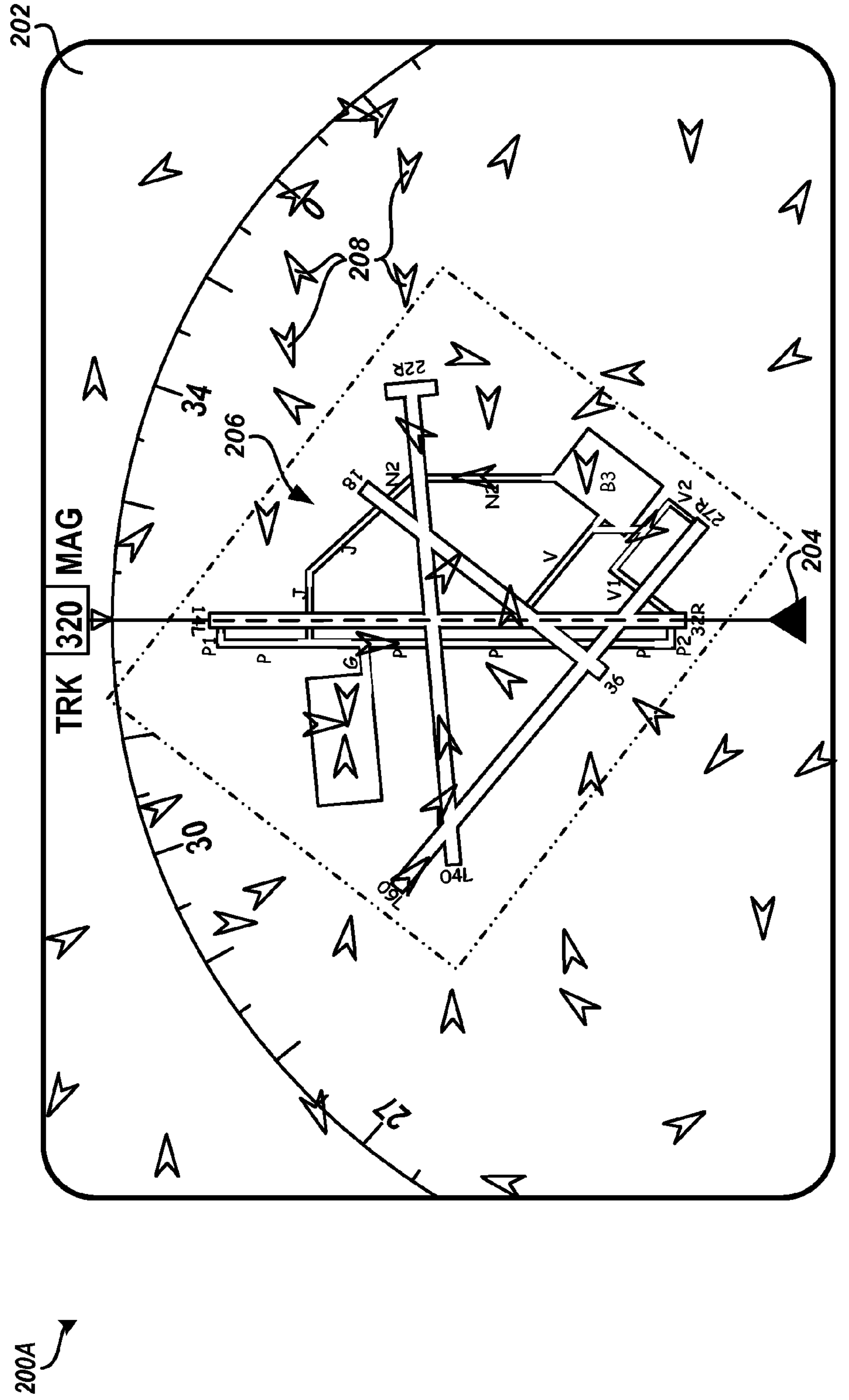
FIGS. 2A-2C are screen images of a navigation display of the aircraft displaying traffic filtered for relevance, according to embodiments presented herein.

FIG. 2A shows a screenshot 200A of a graphical display of relevant traffic 202 on a display unit 106 of the aircraft, such as an MFD in the cockpit. According to one embodiment, the display of relevant traffic 202 may be overlaid on an ND provided by the avionics of the aircraft. The ND may include an ownship indicator 204 that reflects the current position and heading of ownship in relation to other geographical features positioned on the ND, such as the depicted airport 206. The display of relevant traffic 202 further includes a number of traffic indicators 208 showing the current position and heading of nearby traffic.

For purposes of illustration, the display of relevant traffic 202 shown in FIG. 2A is unfiltered, and includes a traffic indicator 208 for all aircraft identified in the traffic information 104 within the range of the ND as currently displayed on the display unit 106. As may be seen in the figure, when the number of traffic indicators 208 displayed is large, the unfiltered display of traffic on the ND may be cluttered and may not add to flight crew situational awareness or adequately inform the crew of hazardous or potentially hazardous conditions. The display of any traffic data displayed in conjunction with the traffic indictors 208 may only further add to the clutter.

Figure 2B:
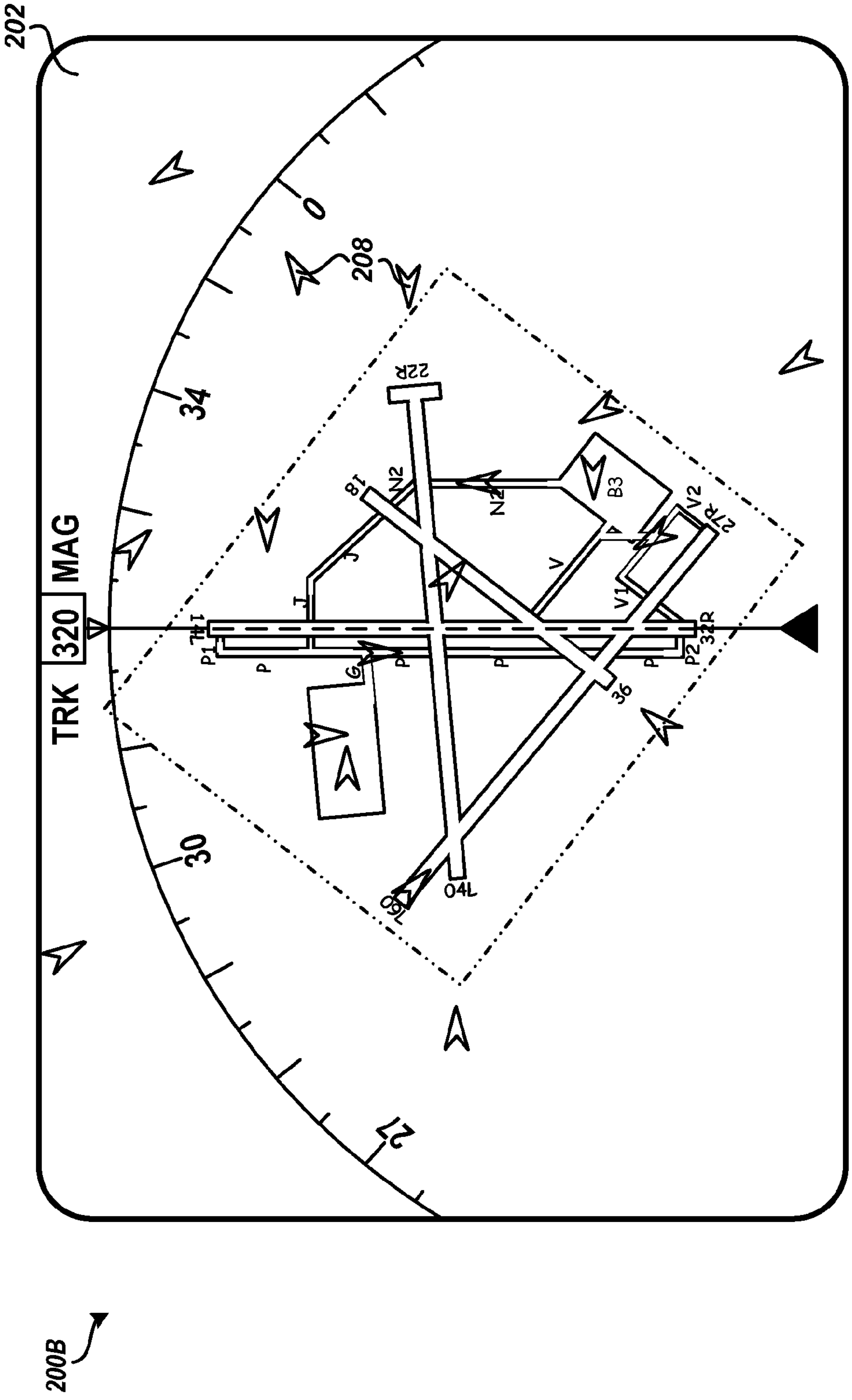

FIG. 2B shows a screenshot 200B of a filtered display of relevant traffic 202 overlaid on the ND. As may be seen in the figure, the number of traffic indicators 208 included in the filtered display of relevant traffic 202 is less than that included in the unfiltered display shown in FIG. 2A. The traffic filtering module 102 may utilize one or more of the filtering strategies described below to filter the current traffic based on state vectors and other information included in the traffic information to determine a subset of relevant traffic to display. For example, the traffic filtering module 102 may include traffic indicators 208 in the filtered display of relevant traffic 202 for traffic below a specific altitude, such as 1000 feet, and within a specific range, such as 3 nm, of an airport for which the aircraft is currently on approach. It will be appreciated that any number and combination of filtering strategies beyond those described herein may be utilized by the traffic filtering module 102 to determine the subset of relevant traffic to display in the filtered display of relevant traffic 202

Figure 2C:
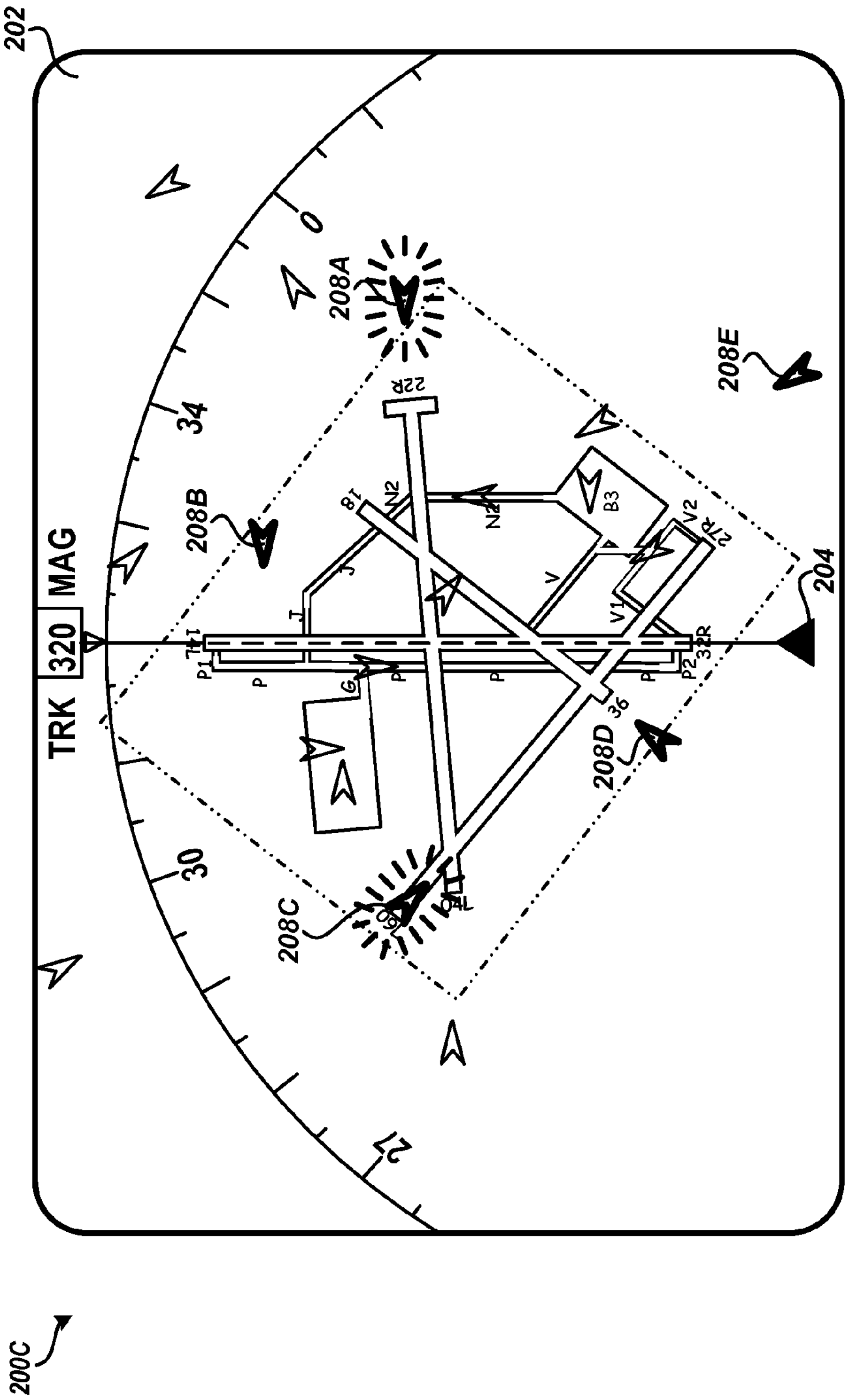

FIG. 2C shows a screenshot 200C of the filtered display of relevant traffic 202 having a number of enhanced traffic indicators 208A-208E. According to one embodiment, the traffic filtering module 102 utilizes one or more of the filtering strategies described below to determine a further subset of relevant traffic for which to enhance the display in the filtered display of relevant traffic 202. The enhanced traffic indicators may be used to indicate hazardous or potentially hazardous traffic conditions to the aircraft flight crew. For example, the traffic filtering module 102 may enhance the traffic indicators 208A-208E for traffic having a projected track that crosses the projected track of ownship 204.

The traffic filtering module 102 may enhance the display of the traffic by causing the enhanced traffic indicator 208A-208E to be enlarged or displayed in bold or in a different color than non-enhanced traffic indicators. In addition, the traffic indicator, such as traffic indicator 208A or 208C shown in FIG. 2C, may be caused to flash or may be displayed with some other visual attribute that serves as an attention getter to further enhance its display. It will be appreciated that any number and combination of filtering strategies beyond those described herein may be utilized by the traffic filtering module 102 to determine the subset of relevant traffic for which to enhance the display in the filtered display of relevant traffic 202. In addition, the enhanced display of a traffic indicator 208A-208E may be accompanied by an aural alert for certain, critical traffic conditions to notify the flight crew of hazardous or potentially hazardous traffic conditions, according to a further embodiment.

In a further embodiment, the traffic filtering module 102 may use the filtering strategies to filter or enhance the display of traffic data displayed in conjunction with traffic indicators 208 in the filtered display of relevant traffic 202. Traffic data may include, but is not limited to, aircraft identifiers, groundspeed, distance from ownship, and the like. This may be in addition to selections for traffic data display made by the flight crew.

Figure 3:
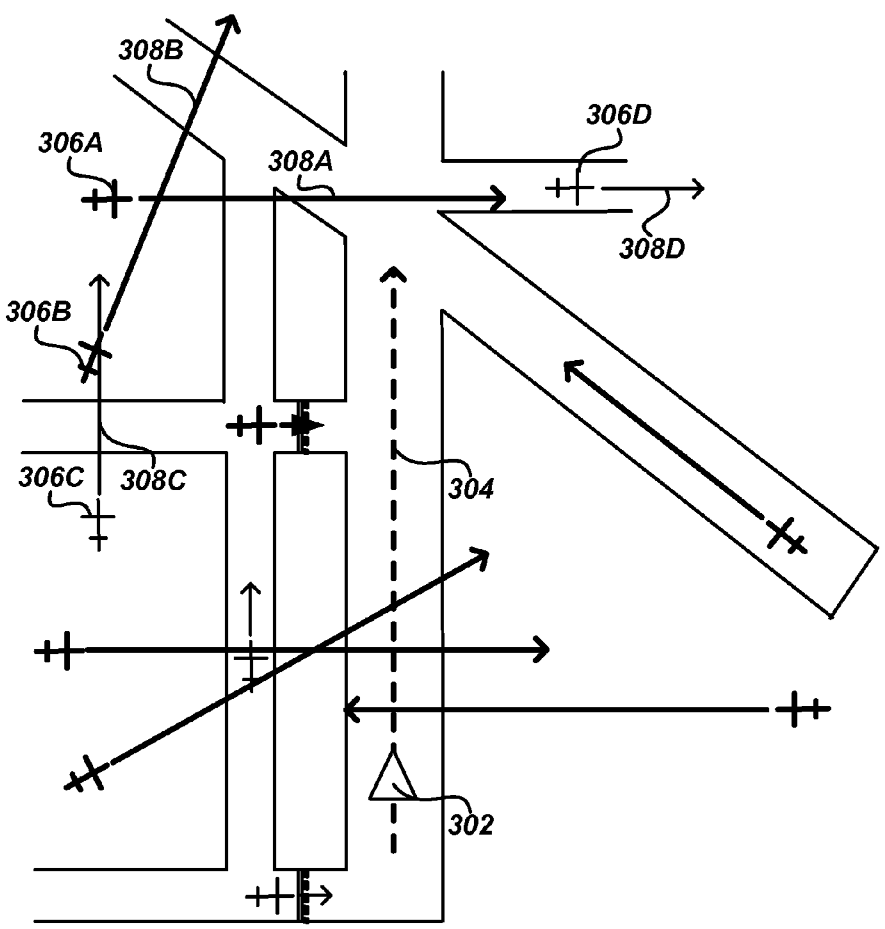
FIG. 3 is a diagram illustrating a strategy of filtering traffic for relevance based on track-track intersections, according to one embodiment presented herein.

FIG. 3 shows details of one strategy of filtering traffic for relevance based on track-track intersections, according to one embodiment. The traffic filtering module 102 may utilize the track-track intersection strategy alone or in combination with other filtering strategies to determine a subset of relevant traffic to display or for which to enhance the display in the display of relevant traffic 202, as described above. According to the track-track intersection filtering strategy, the traffic filtering module 102 projects an ownship track 304 based on the current state vector of ownship 302. The traffic filtering module 102 also projects a track 308A-308D (referred to herein generally as track 308) for each aircraft 306A-306B (referred to herein generally as aircraft 306) or other vehicle within range of ownship 302 or previously determined to be relevant by the traffic filtering module.

The traffic filtering module 102 includes each aircraft 306A-306B having a projected track 308A-308B that intersects the ownship track 304 in the subset of relevant traffic to display or enhance, while aircraft 306C-306D having projected tracks 308C-308D that do not intersect the ownship track 304 are not included in the subset of relevant traffic. In one embodiment, the traffic filtering module 102 extends the ownship track 304 a fixed distance aft of the current position of ownship 302, such as 500 feet. Aircraft 306 having forward tracks 308 that intersect the extended ownship track 304 are then included in the subset of relevant traffic.

Alternatively, the traffic filtering module 102 may extend the tracks 308 aft of the corresponding aircraft 306 and use the forward track 304 of ownship 302 in making a determination of intersection of the tracks. In further embodiments, the traffic filtering module 102 may take into account one or more of the speed of the aircraft 306, the speed of ownship 302, the horizontal distance along the projected tracks 308A-308D at which the intersection with the ownship track 304 occurs, the vertical distance between ownship and traffic, vertical convergence, and the probability of collision in determining whether an aircraft is included in the subset of relevant traffic. Relevant track-track intersections may be bounded by some area or volume of interest, such as within 3 nm of ownship position or an airport reference point, or within 1000 feet altitude of ownship.

Figure 4:
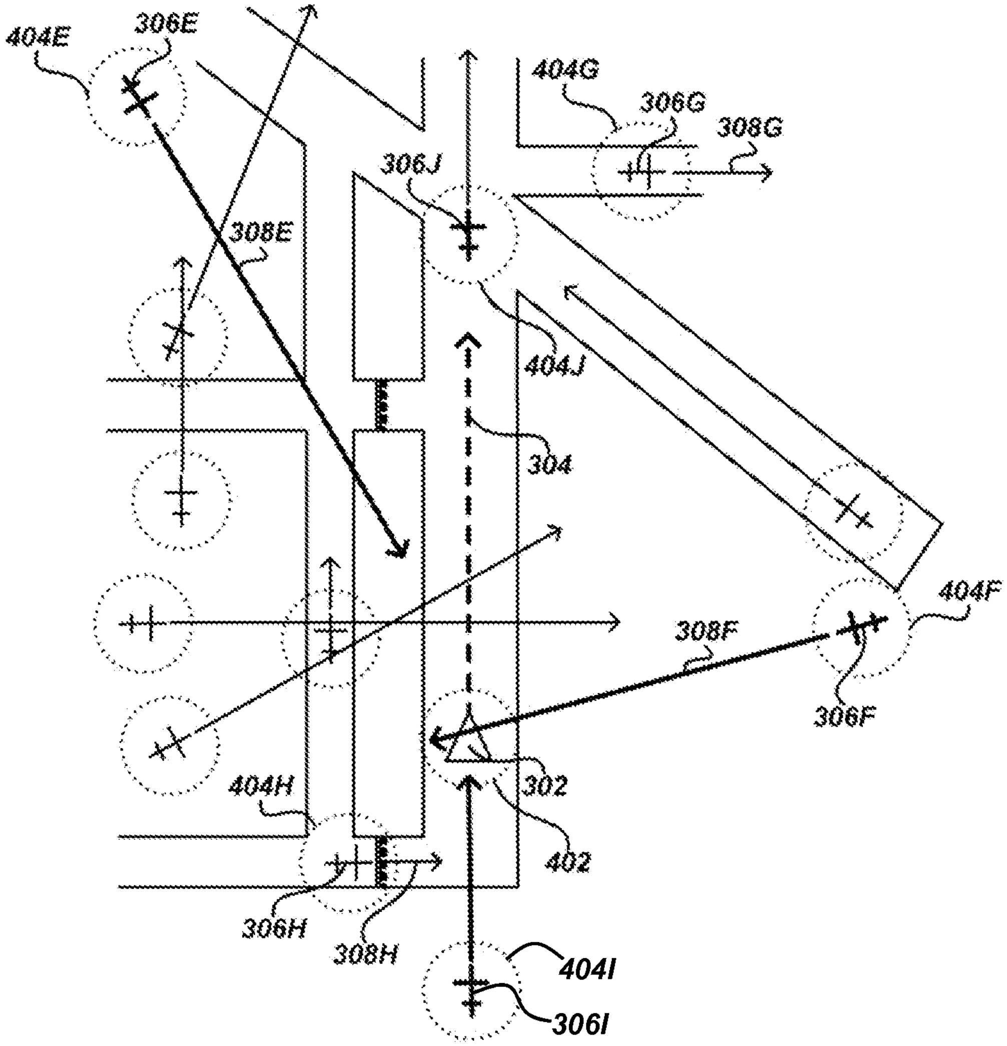
FIG. 4 is a diagram illustrating a strategy of filtering traffic for relevance based on track-aircraft intersections, according to one embodiment presented herein.

FIG. 4 shows details of another strategy of filtering traffic for relevance based on track-aircraft intersections, according to one embodiment. The traffic filtering module 102 may utilize the track-aircraft intersection strategy alone or in combination with other filtering strategies to determine a subset of relevant traffic to display or for which to enhance the display in the display of relevant traffic 202, as described above in regard to FIGS. 2A-2C. According to the track-aircraft intersection filtering strategy, the traffic filtering module 102 projects a forward track 308E-308H for each aircraft 306E-306H or other vehicle within range of ownship 302. Those aircraft 306E-306F having forward tracks 308E-308F that intersect a specific area 402 or volume established around the current position of ownship 302 are included in the subset of relevant traffic to display or enhance, while aircraft 306G-306H having projected tracks 308G-308H that do not intersect the area 402 around ownship are not included in the subset of relevant traffic.

Additionally or alternatively, the traffic filtering module 102 may establish an area 404E-404J (referred to herein generally as area 404) or volume around each aircraft 306E-306J, and include those aircraft 306J for which the ownship track 304 intersects the surrounding area 404J in the subset of relevant traffic. The size of the areas 402, 404 or volumes established around ownship 302 and the other aircraft 306E-306J may be fixed, or may vary dynamically based on one or more of the speed of ownship, the speed of the aircraft, the altitude or phase of flight of ownship or traffic, and the like. In further embodiments, the traffic filtering module 102 may take into account one or more of the speed of ownship 302, the speed of the aircraft 306, the distance along the projected tracks 304, 308 at which the intersection with the area 402, 404 occurs, and the like in determining whether an aircraft is included in the subset of relevant traffic. In an alternative embodiment, the traffic filtering module 102 establishes an area about the forward and/or aft track 304 of ownship 302 extending a perpendicular distance to either side of the rack-line and includes those aircraft 306E-306J that are present inside the area thus defined.

Figure 5:
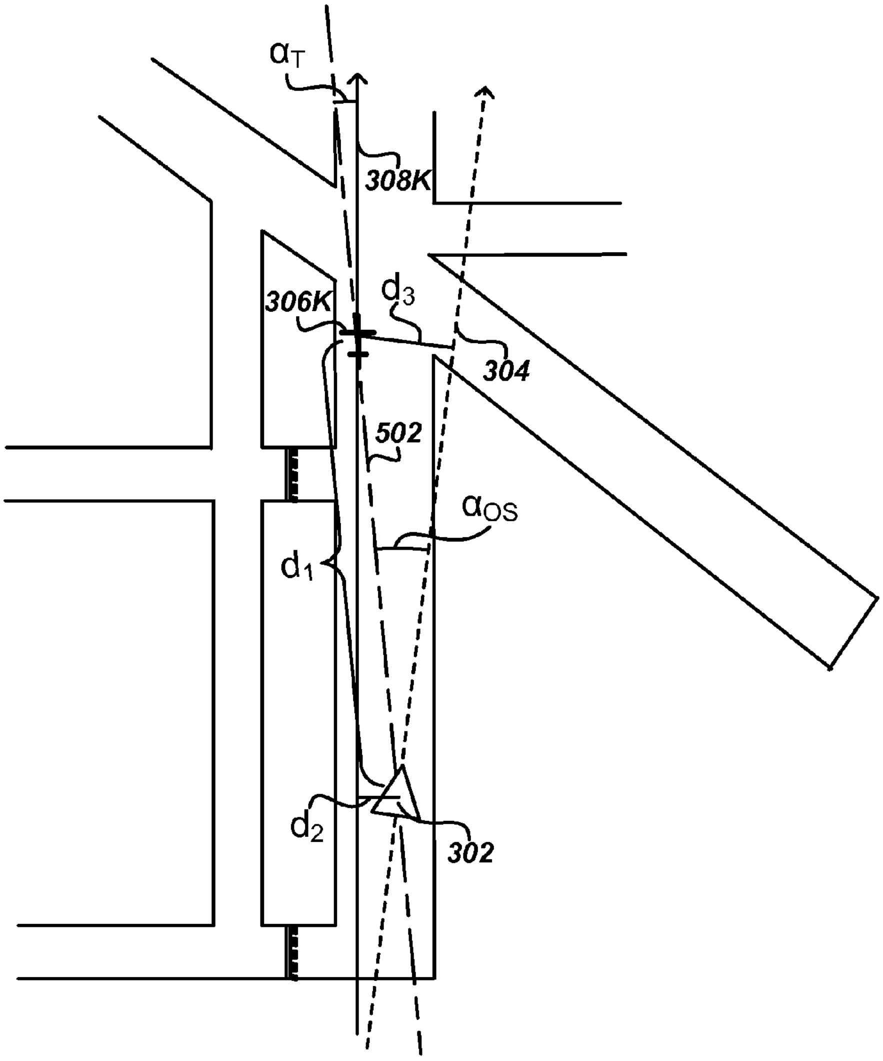
FIG. 5 is a diagram illustrating a strategy of filtering traffic for relevance based on near-parallel track-position vectors, according to one embodiment presented herein.

FIG. 5 shows details of another strategy of filtering traffic for relevance based on near parallel track-position vectors, according to one embodiment. The near parallel track-position vector strategy may capture relevant traffic that does not meet other tests, such as the track-track or track-aircraft intersection strategies described above, because the relative tracks of the aircraft and ownship are parallel or near parallel. The traffic filtering module 102 may utilize the near parallel track-position vector strategy in addition to other filtering strategies to select aircraft to display or for which to enhance the display in the display of relevant traffic 202, as described above in regard to FIGS. 2A-2C.

According to the near parallel track-position vector strategy, the traffic filtering module 102 defines an ownship-traffic position vector 502 between the current position of ownship 302 and the position of each aircraft 306K or other vehicle within range of ownship or previously determined to be relevant by the traffic filtering module. In addition, the traffic filtering module 102 projects an ownship track 304 and aircraft track 308K forward and aft of ownship 302 and the aircraft 306K, respectively. The traffic filtering module 102 then determines the distance $d_2$ between the aircraft track 308K and the current position of ownship 302, i.e. the distance perpendicular to the aircraft track 308K at ownship position. Similarly, the distance $d_3$ between the ownship track 304 and the current position of the aircraft 306K is determined The traffic filtering module 102 further determines the angle $\alpha_{OS}$ between the ownship-traffic position vector 502 and the ownship track 304 and the angle $\alpha_T$ between the vector and the aircraft track 308K.

According to one embodiment, the traffic filtering module 102 includes in the subset of relevant traffic to display or enhance those aircraft 306K where $\alpha_{OS}$ and $\alpha_T$ are less than some threshold angle, such as 20 degrees, and the distance $d_2$ is less than a first threshold distance, such as 500 feet, or the distance $d_3$ is less than a second threshold distance. Alternatively, the traffic filtering module 102 may include in the subset of relevant traffic those aircraft 306K where either $\alpha_{OS}$ or $\alpha_T$ is less than the threshold angle and the distance $d_2$ is less than the first threshold distance or the distance $d_3$ is less than the second threshold distance. It will be appreciated that the values of the threshold angle and threshold distances and the logical relationships between $\alpha_{OS}$, $\alpha_T$, $d_2$, and $d_3$ utilized by the traffic filtering module 102 to select traffic for inclusion may differ from those described herein, or may vary as a function of the current state or phase of flight of ownship 302 and the aircraft 306, e.g. ownship and aircraft both on the ground, ownship and aircraft both in the air, or one in the air and one on the ground.

In another embodiment, the traffic filtering module 102 only includes in the subset of relevant traffic those aircraft 306K within the forward 180 degree field of view of ownship 302, or having ownship within the forward 180 degree field of view of the aircraft, i.e. potential or actual convergence between ownship and the aircraft exists. The traffic filtering module 102 may also take into account the distance $d_1$ between the current positions of ownship 302 and the aircraft 306K along the ownship-traffic position vector 502, changes in the current positions of ownship and the aircraft, and the speeds of ownship and the aircraft in determining whether an aircraft is included in the subset of relevant traffic. For example, the distance $d_1$ and the speeds of ownship 302 and the aircraft 306K may be used to test for convergence or divergence, and a time to potential or actual convergence between the aircraft.

Figure 6:
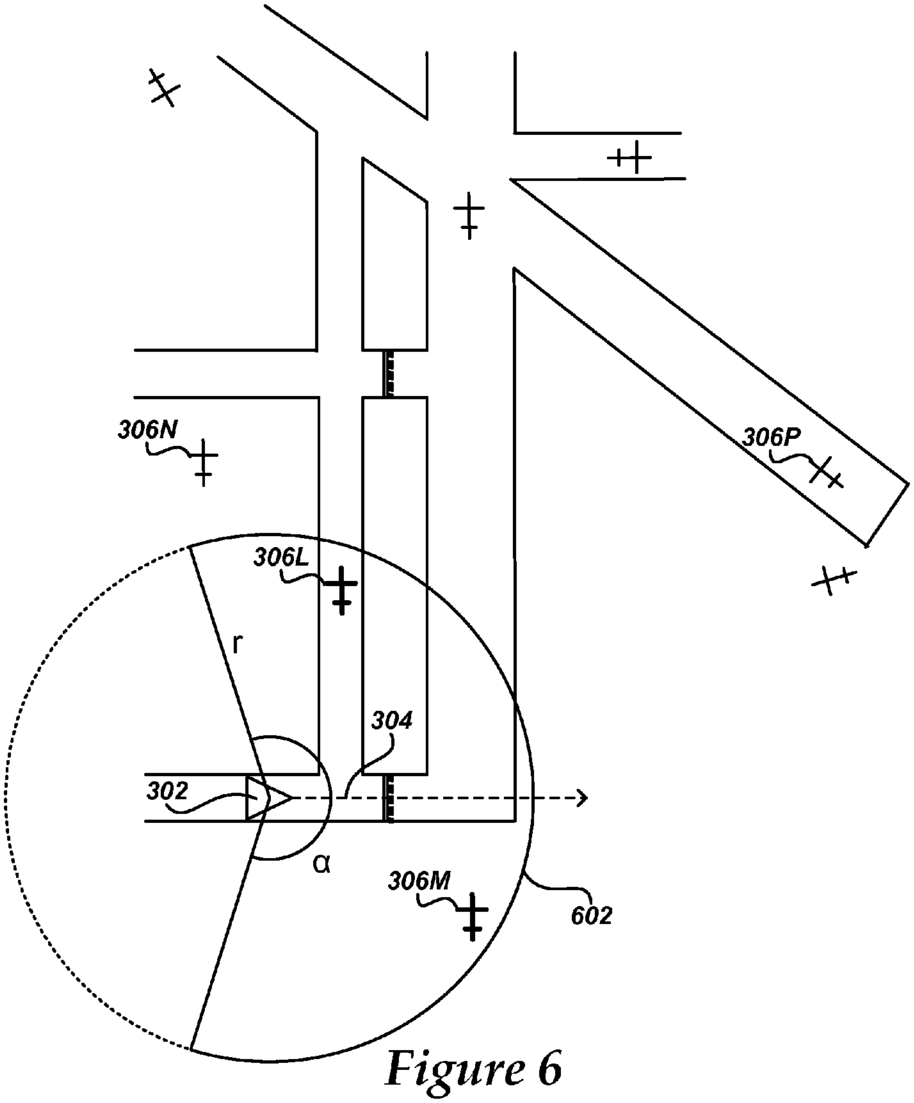
FIG. 6 is a diagram illustrating a strategy of filtering traffic for relevance based on ownship-traffic proximity, according to a one embodiment presented herein.

FIG. 6 shows details of another strategy of filtering traffic for relevance based on ownship-traffic proximity, according to one embodiment. The traffic filtering module 102 may utilize the ownship-traffic proximity strategy alone or in combination with other filtering strategies to determine a subset of relevant traffic to display or for which to enhance the display in the display of relevant traffic 202, as described above in regard to FIGS. 2A-2C. According to the ownship-traffic proximity strategy, the traffic filtering module 102 defines an area 602 or volume around the current position of ownship. In one embodiment, the area 602 or volume is defined by an arc centered on ownship 302 of radius r and covering an angle α from port to starboard across the ownship track 304. For example, the area may be defined by the radius r of 1500 feet and the angle α of 225 degrees.

Those aircraft 306L-306M currently positioned within the defined area 602 or volume established around ownship 302 are included in the subset of relevant traffic to display or enhance, while aircraft 306N-306P outside the area are not included in the subset of relevant traffic. The area 602 or volume may be fixed, or it may vary as a function of the speed, altitude, and/or phase of flight of ownship 302 or other criteria. In addition, traffic within the area or volume may be further filtered for inclusion in the subset of relevant traffic using additional criteria such as the potential for convergence or collision.

It will be appreciated that neither the track-track intersection strategy, the track-aircraft intersection strategy, the near-parallel track-position vector strategy, nor the ownship-traffic proximity strategy described above require the traffic filtering module 102 to have knowledge of the locations of runways, taxiways, air traffic control clearance points, ramps, or other features of the airport in order to determine the subset of relevant traffic to display or enhance. Further, the traffic filtering module 102 does not require knowledge of the flight plan, current take-off or approach runway, or current taxi route of ownship 302 or other aircraft 306 operating at the airport.

Moreover, other filtering strategies that do not require knowledge of runway, taxiway, or taxi route locations at an airport may be utilized by the traffic filtering module 102 to determine the subset of relevant traffic beyond those described herein. For example, traffic may be filtered based on any combination of altitude, speed, distance from ownship, distance from airport reference point ("ARP"), and the like. Further, the threshold values for altitudes, speeds, and distances may be interdependent and/or dependent on the state of the aircraft. For example, aircraft 306 at less than 1000 feet above ground level and moving at greater than 50 knots within 5 nautical miles of the ARP may be included in the subset of relevant traffic, as well as ground level aircraft or vehicles moving greater than 15 knots and within 1500 feet of ownship.

Additional criteria such as horizontal or vertical convergence or divergence, ownship and traffic altitudes and changes in altitudes, may also be used. Similar strategies and thresholds as those described herein may further be used to disqualify aircraft 306 or other vehicles for inclusion in the subset of relevant traffic. For example, divergence may disqualify the aircraft 306 from inclusion. It is intended that all such filtering strategies be included in the scope of this application.

Figure 7:
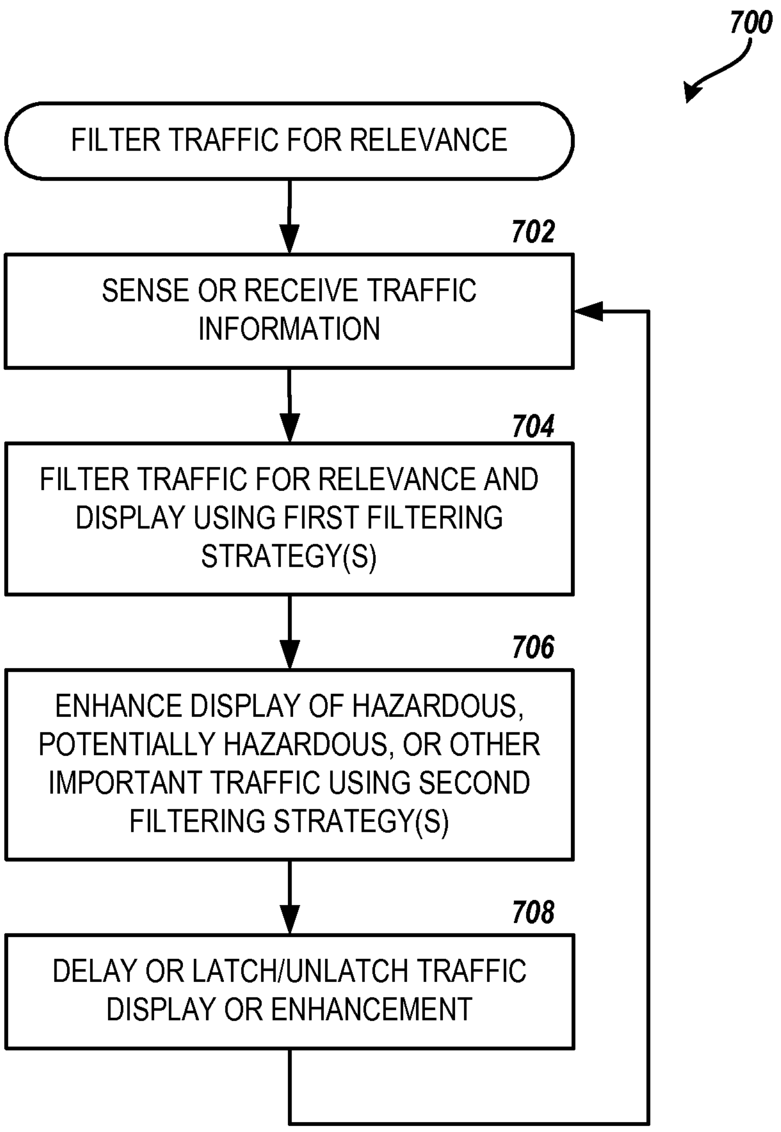
FIG. 7 is a flow diagram illustrating one method for filtering traffic for relevance for display, enhancement, and/or alerting, as provided in the embodiments presented herein.

Turning now to FIG. 7, additional details will be provided regarding embodiments presented herein for filtering relevant traffic from sensed or received traffic information 104 for display, enhancement, or alerting. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 7 shows a routine 700 for filtering relevant traffic for display or enhancement on a display unit 106 of the aircraft. In one embodiment, the routine 700 is performed by the traffic filtering module 102 described above in regard to FIG. 1. It will be appreciated that the routine 700 may also be performed by another module or component of the avionics systems of the aircraft, or by a combination of modules and components. The routine 700 begins at operation 702, where the traffic filtering module 102 senses or receives traffic information 104 from nearby aircraft and other vehicles. As described above in regard to FIG. 1, the traffic information 104 may be sensed by on-board aircraft systems, data-linked from ground sources, or received from an automatic position broadcast system, such as ADS-B. The traffic information 104 includes the current state vectors and other information regarding the nearby aircraft and other vehicles.

The routine 700 proceeds from operation 702 to operation 704, where the traffic filtering module 102 applies one or more of the filtering strategies described herein to the traffic information 104 to determine a subset of relevant traffic for which to display traffic indicators 208 in the display of relevant traffic 202, such as that shown in FIG. 2B, for example. The traffic filtering module 102 may apply multiple filtering strategies sequentially, to limit the number of aircraft 306 included in the subset of relevant traffic. For example, the traffic filtering module 102 may select the subset of relevant traffic from all aircraft 306 identified in the traffic information 104 utilizing the ownship-traffic proximity strategy, further limited by those aircraft 306 having tracks intersecting ownship determined by the track-aircraft intersection strategy.

Additionally or alternatively, the traffic filtering module 102 may combine the relevant traffic determined through the application of multiple strategies to the traffic information 104 to qualify or disqualify aircraft 306 for inclusion in the subset of relevant traffic. For example, the traffic filtering module 102 may combine the relevant traffic determined by the track-track intersection strategy and the near-parallel track-position vector strategy in the subset of relevant traffic for which to display traffic indicators 208 in the display of relevant traffic 202.

From operation 704, the routine 700 proceeds to operation 706, where the traffic filtering module 102 further applies one or more of the filtering strategies described herein to the subset of relevant traffic determined at operation 704 to enhance the display of traffic indicators 208 corresponding to aircraft 306 representing hazardous, potentially hazardous, or other critical traffic conditions, such as those shown in FIG. 2C. For example, the traffic filtering module 102 may change the size, shape, color, or other graphical attribute of traffic indicators 208 in the display of relevant traffic 202 corresponding to aircraft 306 having tracks 308 intersecting ownship track 304 to call flight crew attention to the traffic.

In addition, the traffic filtering module 102 may cause to blink or otherwise further enhance the traffic indicators 208 corresponding to aircraft 306 having potential convergence with ownship 302 along their current relative tracks to further highlight the critical traffic conditions. In a further embodiment, these critical traffic conditions may be further accompanied by an aural alert provided to the flight crew through the speaker 114 in the cockpit, for example.

The routine 700 proceeds from operation 706 to operation 708, where the traffic filtering module 102 may delay or latch/unlatch the display and enhancement of relevant traffic indicators 208 and accompanying traffic data. According to one embodiment, the traffic filtering module 102 may implement delayed display and display latching strategies for the display of relevant traffic 202. For example, once a particular aircraft 306 is identified for inclusion in the subset of relevant traffic according to one of the filtering strategies described above, the traffic filtering module 102 may further require that the aircraft remain relevant according to that strategy for some period of time, such as 5 to 10 seconds, before displaying a traffic indicator 208 and/or traffic data corresponding to that aircraft in the display of relevant traffic 202.

Conversely, once the traffic filtering module 102 has displayed a traffic indicator 208 and/or traffic data corresponding to an aircraft 306 in the display of relevant traffic 202, the display of the traffic indicator 208 and data may be latched for some period of time, such as 5 to 10 seconds, or until some other criteria is satisfied such as air or ground state change, speed, heading, or altitude changes greater than some predetermined value, and the like. The delayed display and display latching strategies may be implemented by the traffic filtering module 102 to ensure continuity in the display of relevant traffic 202, by inhibiting the momentary display and removal of traffic indicators 208 during ownship or traffic maneuvering. From operation 708, the routine 700 returns to operation 702, where the routine 700 is repeated regularly to provide a continuously updated display of relevant traffic 202 on the display unit 106 of the aircraft.

Figure 8:
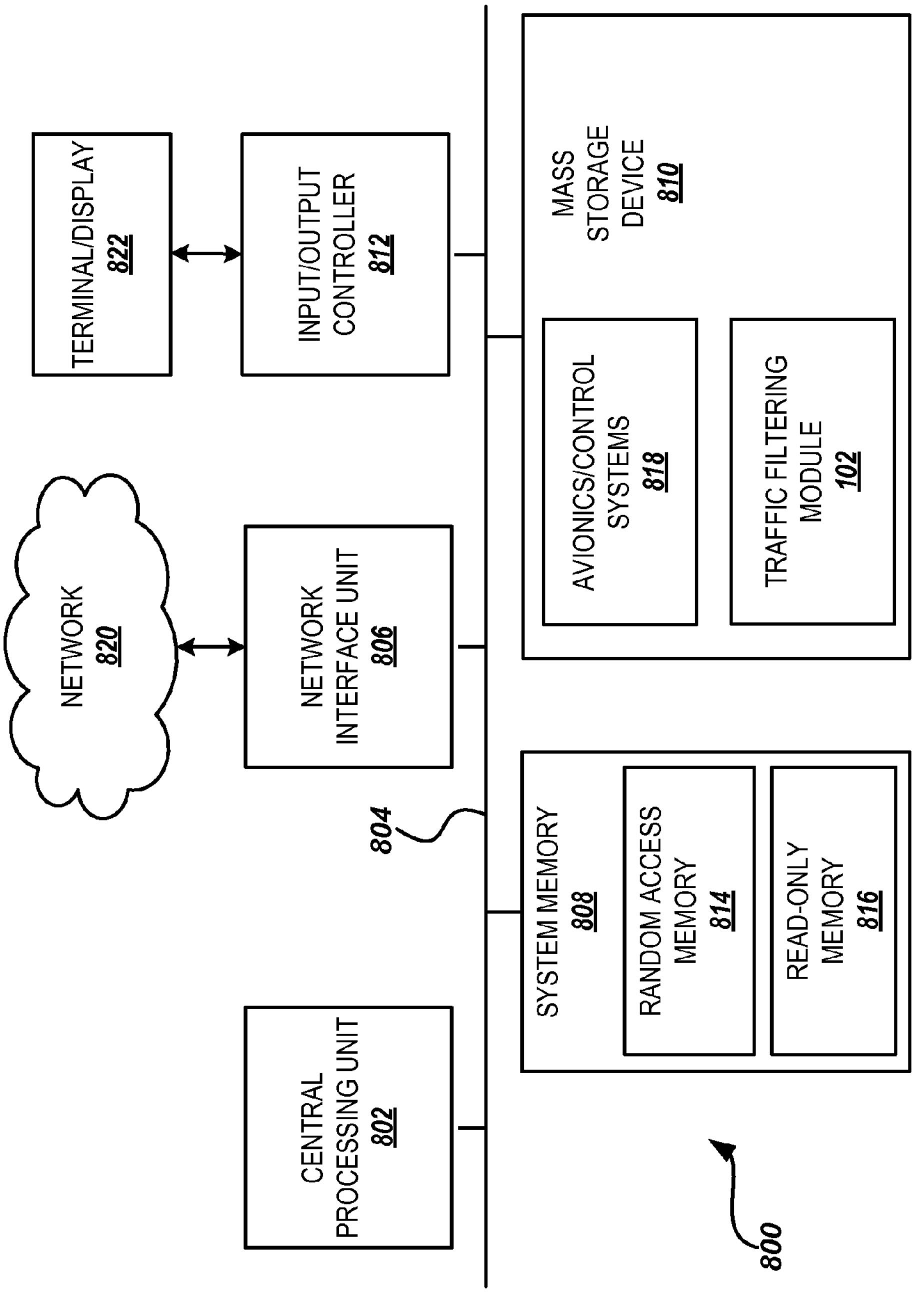
FIG. 8 is a block diagram showing an illustrative computer hardware and software architecture for a computing system capable of implementing aspects of the embodiments presented herein.

FIG. 8 shows an illustrative computer architecture 800 capable of executing the software components described herein for filtering relevant traffic for display or enhancement on a display unit 106 of an aircraft, in the manner presented above. The computer architecture 800 may be embodied in single computing device or in a combination of one or more processing units, storage units, and/or other computing devices implemented in the avionics systems of the aircraft. The computer architecture 800 includes one or more central processing units 802 ("CPUs"), a system memory 808, including a random access memory 814 ("RAM") and a read-only memory 816 ("ROM"), and a system bus 804 that couples the memory to the CPUs 802.

The CPUs 802 may be standard programmable processors that perform arithmetic and logical operations necessary for the operation of the computer architecture 800. The CPUs 802 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 800 also includes a mass storage device 810. The mass storage device 810 may be connected to the CPUs 802 through a mass storage controller (not shown) further connected to the bus 804. The mass storage device 810 and its associated computer-readable media provide non-volatile storage for the computer architecture 800. The mass storage device 810 may store various avionics systems and control systems 818, as well as specific application modules or other program modules, such as the traffic filtering module 102 described above in regard to FIG. 1. The mass storage device 810 may also store data collected or utilized by the various systems and modules.

The computer architecture 800 may store programs and data on the mass storage device 810 by transforming the physical state of the mass storage device to reflect the information being stored. The specific transformation of physical state may depend on various factors, in different implementations of this disclosure. Examples of such factors may include, but are not limited to, the technology used to implement the mass storage device 810, whether the mass storage device is characterized as primary or secondary storage, and the like. For example, the computer architecture 800 may store information to the mass storage device 810 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 800 may further read information from the mass storage device 810 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 800. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800.

According to various embodiments, the computer architecture 800 may operate in a networked environment using logical connections to other avionics in the aircraft through a network, such as the network 820. The computer architecture 800 may connect to the network 820 through a network interface unit 806 connected to the bus 804. It should be appreciated that the network interface unit 806 may also be utilized to connect to other types of networks and remote computer systems. The computer architecture 800 may also include an input-output controller 822 for receiving input and providing output to aircraft terminals and displays, such as the aircraft display unit 106 described above in regard to FIG. 1. The input-output controller 822 may receive input from other devices as well, including an MCDU, an EFIS control panel, a DSP, a keyboard, mouse, electronic stylus, or touch screen associated with the display unit 106. Similarly, the input-output controller 822 may provide output to other displays, a printer, or other type of output device.

Based on the foregoing, it should be appreciated that technologies for filtering relevant traffic from traffic information for display, enhancement, or alerting are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for filtering traffic for relevance for display or enhancement on a display unit of a vehicle, the method comprising performing instructions under the control of one or more computer systems for:

receiving, by the one or more computer systems, traffic information;

applying, by the one or more computer systems, a first filtering strategy to the traffic information to determine a subset of relevant traffic, wherein the first filtering strategy being independent of one of runway, taxiway, or taxi route locations at an airport and determines a first intersection between a projected track of the vehicle and projected tracks of one or more nearby vehicles, a second intersection of projected tracks of one or more nearby vehicles with an area defined around a current position of the vehicle, and a third intersection between a projected track of the vehicle with areas defined around one or more nearby vehicles; and generating, by the one or more computer systems, a display of relevant traffic comprising one or more traffic indicators corresponding to the subset of relevant traffic for display on the display unit.

2. The method of claim 1, further comprising performing instructions under the control of the one or more computer systems for regularly applying the first filtering strategy to updated traffic information and updating the display of relevant traffic on the display unit as the vehicle is in operation.

3. The method of claim 1, wherein the traffic information comprises current state vectors and other information regarding nearby vehicles received via automatic dependent surveillance-broadcast ("ADS-B").

4. The method of claim 1, wherein the display of relevant traffic is overlaid, by the one or more computer systems, on a navigation display or an airport moving map display on the display unit.

5. The method of claim 1, further comprising:

applying a second filtering strategy to determine, by the one or more computer systems, that one or more nearby vehicles have parallel or near-parallel tracks with a projected track of the vehicle based on an angle between a vehicle-traffic position vector and one of the projected track of the vehicle or the projected track of the one or more nearby vehicles being less than a threshold angle, the vehicle-traffic position vector being defined between a current position of the vehicle and a current position of the one or more nearby vehicles.

6. The method of claim 1, further comprising:

applying a second filtering strategy to determine, by the one or more computer systems, that one or more nearby vehicles are within a defined area centered around the vehicle, wherein the defined area being based on a radius having a value that varies based on a function of one of speed, altitude or phase of vehicle flight, and an angle from port to starboard across a projected track of the vehicle.

7. The method of claim 1, further comprising performing instructions under the control of the one or more computer systems for:

applying, by the one or more computer systems, a second filtering strategy to the subset of relevant traffic to determine traffic having critical traffic conditions; and enhancing, by the one or more computer systems, the display of the traffic indicators corresponding to the traffic having critical traffic conditions in the display of relevant traffic.

8. The method of claim 7, further comprising performing instructions under the control of the one or more computer systems for providing at least one of an aural annunciation and alert alone or in conjunction with enhancing the display of the traffic indicators corresponding to the traffic having critical traffic conditions in the display of relevant traffic.

9. A system for filtering relevant traffic for display or enhancement on a display unit of an aircraft, comprising:

a memory for storing a program containing computer-executable instructions for filtering traffic information to determine relevant traffic for display and enhancement; and a processing unit functionally coupled to the memory, the processing unit being responsive to the computer-executable instructions and configured to:

receive the traffic information, apply a first filtering strategy to the traffic information to determine a subset of relevant traffic, wherein the first filtering strategy being independent of one of runway, taxiway, or taxi route locations at an airport, the first filtering strategy comprises a track-track intersection strategy based on determining a first intersection between a projected track of the vehicle and projected tracks of one or more nearby vehicles, and a track-aircraft intersection strategy based on determining a second intersection of projected tracks of one or more nearby vehicles with an area defined around a current position of the vehicle, and a third intersection of the projected track of the vehicle with areas defined around one or more nearby vehicles, and generate a display of relevant traffic comprising one or more traffic indicators corresponding to the subset of relevant traffic for display on the display unit.

10. The system of claim 9, wherein the traffic information comprises current state vectors and other information regarding nearby vehicles received via ADS-B.

11. The system of claim 9, wherein the display of relevant traffic is overlaid on a navigation display or an airport moving map display on the display unit.

12. The system of claim 9, wherein the processing unit is further configured to apply a second filtering strategy to the subset of relevant traffic to determine traffic having critical traffic conditions, the second filtering strategy comprises one or more of:

a near-parallel track-position vector strategy based on determining an angle between a vehicle-traffic position vector and one of the projected track of the vehicle or the projected track of the one or more nearby vehicles being less than a threshold angle, the vehicle-traffic position vector being defined between a current position of the vehicle and a current position of the one or more nearby vehicles; or an ownship-traffic proximity strategy based on determining that one or more nearby vehicles are within a defined area centered around the vehicle, wherein the defined area being based on a radius having a value that varies based on a function of one of speed, altitude or phase of vehicle flight, and an angle from port to starboard across a projected track of the vehicle.

13. The system of claim 9, wherein the processing unit is further configured to enhance the display of the traffic indicators corresponding to the traffic having critical traffic conditions in the display of relevant traffic.

14. A non-transitory computer-readable medium comprising computer-executable instructions that, when executed by an avionics computer of an aircraft, cause the avionics computer to:

receive traffic information, apply a first filtering strategy to the traffic information to determine a subset of relevant traffic, wherein the first filtering strategy being independent of one of runway, taxiway, or taxi route locations at an airport, the first filtering strategy comprises a track-track intersection strategy based on determining a first intersection between a projected track of the vehicle and projected tracks of one or more nearby vehicles, and a track-aircraft intersection strategy based on determining a second intersection of projected tracks of one or more nearby vehicles with an area defined around a current position of the vehicle, and a third intersection of the projected track of the vehicle with areas defined around one or more nearby vehicles, and generate a display of relevant traffic comprising one or more traffic indicators corresponding to the subset of relevant traffic for display on a display unit of the aircraft.

15. The non-transitory computer-readable medium of claim 14, wherein the traffic information comprises current state vectors and other information regarding nearby vehicles received via ADS-B.

16. The non-transitory computer-readable medium of claim 14, wherein the display of relevant traffic is overlaid on a navigation display or an airport moving map display on the display unit.

17. The non-transitory computer-readable medium of claim 14, comprising further computer-executable instructions that cause the avionics computer to:

apply a second filtering strategy to the subset of relevant traffic to determine traffic having critical traffic conditions; and enhance the display of the traffic indicators corresponding to the traffic having critical traffic conditions in the display of relevant traffic.

18. The non-transitory computer-readable medium of claim 17, containing further computer-executable instructions that cause the avionics computer to provide an aural alert in conjunction with enhancing the display of the traffic indicators corresponding to the traffic having critical traffic conditions in the display of relevant traffic.

* * * * *